Jan. 9, 1934.　　　　　W. N. BOOTH　　　1,943,159
HUB CAP AND MEANS FOR SECURING SAME TO WHEEL HUBS
Filed Oct. 15, 1928
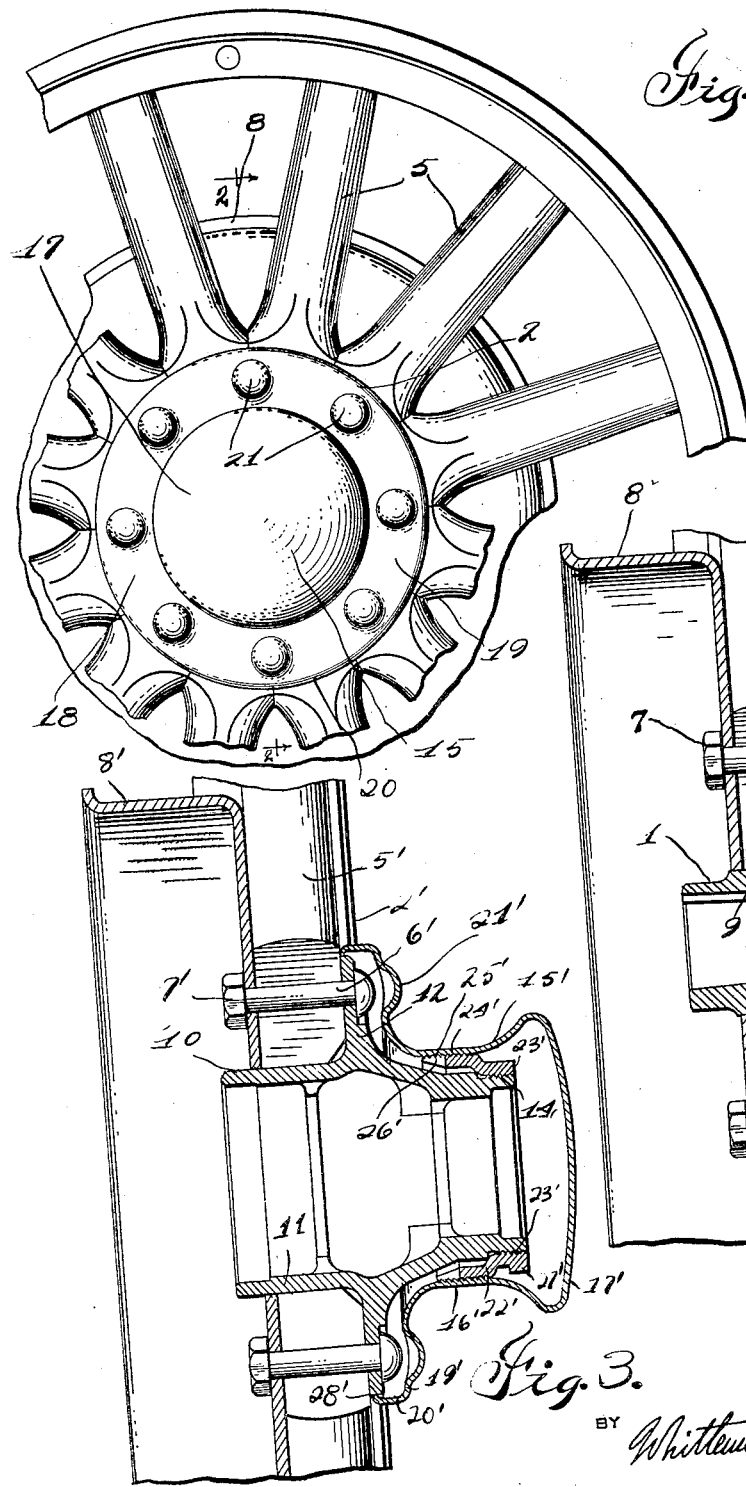
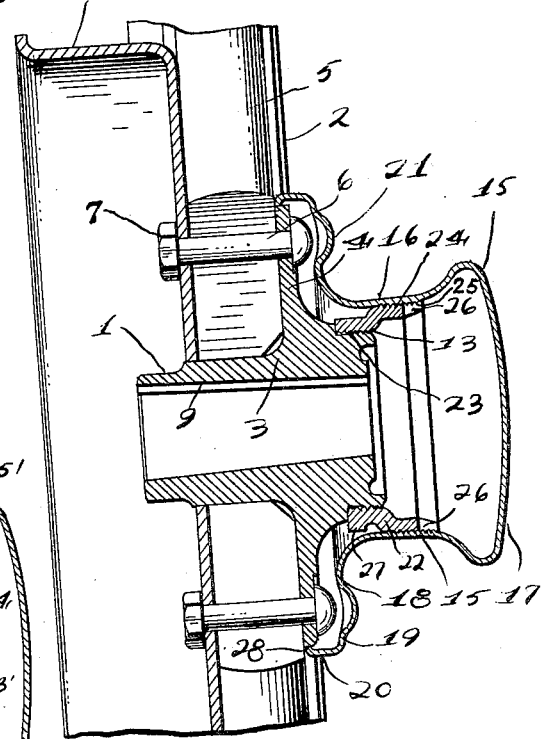
Fig. 1.
Fig. 2.
Fig. 3.
INVENTOR
William N. Booth
BY Whittemore Hulbert & Whittemore Belknap
ATTORNEYS Patented Jan. 9, 1934

1,943,159

UNITED STATES PATENT OFFICE

1,943,159

HUB CAP AND MEANS FOR SECURING SAME TO WHEEL HUBS

William N. Booth, Detroit, Mich., assignor to Kelsey-Hayes Wheel Corporation, Detroit, Mich., a corporation of New York Application October 15, 1928. Serial No. 312,714

5 Claims. (Cl. 301—108)

The invention relates to vehicle wheels and refers more particularly to hub caps and means for securing the same to wheels. One of the objects of the invention is to provide an improved construction of hub cap which may be readily secured to a wheel and which greatly improves the appearance thereof. Another object is to provide a common means for alternatively securing the hub cap to a front and a rear wheel. Further objects of the invention reside in the novel features of construction and combinations and arrangements of parts as more fully hereinafter set forth.

In the drawing:—

Figure 1 is a fragmentary front elevation of a vehicle wheel embodying my invention;

Figure 2 is a cross section on the line 2—2 of Figure 1;

Figure 3 is a similar view through a front wheel.

The vehicle wheel shown in the present instance is a motor vehicle wheel having the hub 1 and the wheel body 2. The hub has the barrel 3 and the radial fixed flange 4 intermediate the ends of the barrel. The wheel body has the wooden spokes 5 which engage the rear portion of the barrel 3 and the rear face of the flange portion 4 and are secured to the hub by the series of bolts 6 and nuts 7. The brake drum 8 is also preferably secured to the wheel body and against the rear face of the spokes by the same securing means.

As shown in Figure 2, the barrel 3 is provided with the key-way 9 for non-rotatably securing the hub upon the drive shaft of the motor vehicle, so that the wheel shown in Figures 1 and 2 is a rear or drive wheel.

The wheel shown in Figure 3 is a front steering wheel and is of the same construction as the wheel shown in Figures 1 and 2 with the exception that its hub 10 is made so that it may be journaled upon the steering spindle. Specifically, the barrel 11 of this hub extends in advance of the fixed flange 12 a greater distance than the barrel 3 relative to the fixed flange 4. The front portions of both barrels 3 and 11 are formed with the same external threads 13 and 14, respectively.

To provide for using a hub which may be economically manufactured, I provide a hub cap for completely concealing the hub. This hub cap may have various shapes without penalizing the cost of manufacture of the hub, and as shown in the present instance, 15 is the hub cap which is formed of sheet metal and preferably drawn to shape. This hub cap has the barrel portion 16 with the enlarged front end 17 and the flange portion 18 with the radially extending flange 19 and the transverse annular flange 20. The radially extending flange is preferably formed with the forwardly extending bosses 21 corresponding in number to the bolts 6 and having the appearance of bolt heads. The annular flange is of a diameter to engage over the fixed hub flange 4 so that the hub cap can completely conceal the hub 1, as shown in Figure 2. This hub cap may also be used, as shown in Figure 3, to completely conceal the hub 10.

To avoid marring or damaging the finish or paint of the spokes upon engagement of the hub cap therewith, this hub cap is formed with the transverse or inwardly extending flange 28 at its rear edge adapted to have a surface contact with the spokes.

To secure the hub cap 15 to the wheel, I have provided the adapter 22, which is adapted to threadedly engage the wheel hub and the hub cap. This adapter has the internal threaded portion 23 at one end and the enlarged external threaded portion 24 at the other end, the internal threaded portion being adapted to engage the threads 13 upon the barrel 3 and the external threaded portion being adapted to engage the internal threads 25 upon the barrel portion 16 of the hub cap. This adapter is provided with the diametrically opposite slots 26 in the outer end of the external threaded portion 24 and with the projections 27 extending outwardly from the inner end of its internal threaded portion 23, both the slots and the projections being peripherally spaced and providing shoulders for engagement by suitable tools to turn the adapter upon the hub. This adapter is designed to be used upon either the front or the rear wheel hubs, which vary in length, to secure the same hub cap alternatively to these hubs and for this purpose the adapter may be reversed end for end to take care of the varying distances between the front ends of the barrels of the hubs and their fixed flanges, the shoulders formed by the slots 26 and projections 27 being adapted to be alternatively engaged by suitable tools.

In Figure 3 the parts corresponding to the parts shown in Figures 1 and 2 are indicated by corresponding reference characters which have been primed and it will be noted from inspection of this figure that the adapter 22' is reversed end for end so that the hub cap 15' may properly contact with the wheel body formed by the wooden spokes 5'.

What I claim as my invention is:

1. An adapter for alternatively securing a hub cap to vehicle wheel hubs having barrel portions of different lengths, comprising a member having an annular portion engageable with the barrel portions aforesaid and provided with another annular portion having an internal diameter greater than the external diameter of the barrel portions for sleeving over the latter and arranged to engage said cap for securing the same in assembled position.

2. An adapter for alternatively securing a hub cap to vehicle wheel hubs having barrel portions of different lengths, comprising a reversible sleeve-like member having a portion engageable with the barrel portions aforesaid and having another portion provided with an internal diameter greater than the external diameter of the barrel portions and arranged to sleeve over the latter in one position of the member and to extend axially outwardly therefrom in the reversed position of said member, and means for securing the cap to the second-mentioned portion of the member.

3. An adapter for alternatively securing a hub cap to vehicle wheel hubs having barrel portions of different lengths, comprising a reversible sleeve-like member terminating at one end in a threaded portion adapted to threadedly engage the barrel portions and terminating at the opposite end in an enlarged portion having an internal diameter substantially greater than the external diameter of the barrel portions and arranged to sleeve over the latter in one position of the member and to extend axially outwardly from the end portions of the barrels in the reverse position of the member, said enlarged portion having threads for threadedly engaging the hub cap to secure the same in position.

4. An adapter for alternatively securing a hub cap to vehicle wheel hubs having differently formed barrels, comprising a member having a portion detachably engageable with the barrels of the hubs and having another portion spaced axially and radially outwardly from the portion aforesaid and detachably engageable with the cap for securing the same in position, said member being reversible end-for-end to vary the position of the second named portion of the member axially of the barrels.

5. An adapter for alternatively securing a hub cap to vehicle wheel hubs having differently formed barrels, comprising a member having an internally threaded portion detachably engageable with the barrels aforesaid and having an externally threaded portion spaced axially from the portion aforesaid and detachably engageable with the cap for securing the same in position, said member being reversible end-for-end to vary the position of the externally threaded portion of the member axially of the hub barrels.

WILLIAM N. BOOTH.